(12) United States Patent
Yasui

(10) Patent No.: US 9,195,478 B2
(45) Date of Patent: Nov. 24, 2015

(54) IMAGE FORMING APPARATUS FOR DISPLAYING GUIDANCE

(75) Inventor: Kazumasa Yasui, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 192 days.

(21) Appl. No.: 13/618,932

(22) Filed: Sep. 14, 2012

(65) Prior Publication Data
US 2013/0077111 A1 Mar. 28, 2013

Related U.S. Application Data

(60) Provisional application No. 61/540,502, filed on Sep. 28, 2011, provisional application No. 61/540,500, filed on Sep. 28, 2011.

(51) Int. Cl.
| | |
|---|---|
| G06F 3/12 | (2006.01) |
| G06K 15/00 | (2006.01) |
| G06F 9/44 | (2006.01) |
| H04N 1/00 | (2006.01) |
| G03G 15/00 | (2006.01) |

(52) U.S. Cl.
CPC ............ *G06F 9/4446* (2013.01); *G03G 15/502* (2013.01); *G03G 15/70* (2013.01); *H04N 1/00408* (2013.01); *H04N 1/00477* (2013.01); *H04N 1/00591* (2013.01); *H04N 1/00602* (2013.01); *H04N 1/00612* (2013.01); *H04N 1/00615* (2013.01); *H04N 1/00633* (2013.01); *H04N 1/00639* (2013.01); *H04N 1/00663* (2013.01); *H04N 1/00705* (2013.01); *H04N 1/00771* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2007/0092271 | A1 | 4/2007 | Sayama et al. |
| 2007/0201050 | A1* | 8/2007 | Mochizuki et al. ............ 358/1.1 |
| 2007/0220359 | A1* | 9/2007 | Mochizuki ....................... 714/44 |
| 2009/0033028 | A1* | 2/2009 | Yahata et al. .................. 271/259 |
| 2009/0102118 | A1* | 4/2009 | Shibano ................... 271/265.03 |
| 2010/0277762 | A1* | 11/2010 | Eguchi et al. ................. 358/1.15 |
| 2011/0277604 | A1* | 11/2011 | Yahata et al. ..................... 83/13 |
| 2012/0093526 | A1 | 4/2012 | Yasui |

FOREIGN PATENT DOCUMENTS

| | | |
|---|---|---|
| CN | 101030069 | 9/2007 |
| CN | 101376470 | 3/2009 |

(Continued)

OTHER PUBLICATIONS

Office Action dated Oct. 10, 2014, filed in corresponding Chinese Patent Application No. 201210357288.9, with English translation.

(Continued)

*Primary Examiner* — Huo Long Chen
(74) *Attorney, Agent, or Firm* — Patterson & Sheridan, LLP

(57) ABSTRACT

According to one embodiment, a display device includes a detecting section configured to detect information concerning a sheet, a control section configured to set image guidance according to a result of the detection by the detecting section, and a display section configured to display the image guidance set by the control section.

7 Claims, 7 Drawing Sheets

(56) References Cited

FOREIGN PATENT DOCUMENTS

| | | |
|---|---|---|
| JP | 10-107940 | 4/1998 |
| JP | H11-231729 | 8/1999 |
| JP | 2000-155508 | 6/2000 |
| JP | 2005-208335 | 8/2005 |
| JP | 2005-318206 A | 11/2005 |
| JP | 2007-223239 | 9/2007 |

OTHER PUBLICATIONS

Office Action mailed Dec. 24, 2014, filed in corresponding Japanese Patent Application No. 22012-206935, with English translation.

* cited by examiner (Home position)

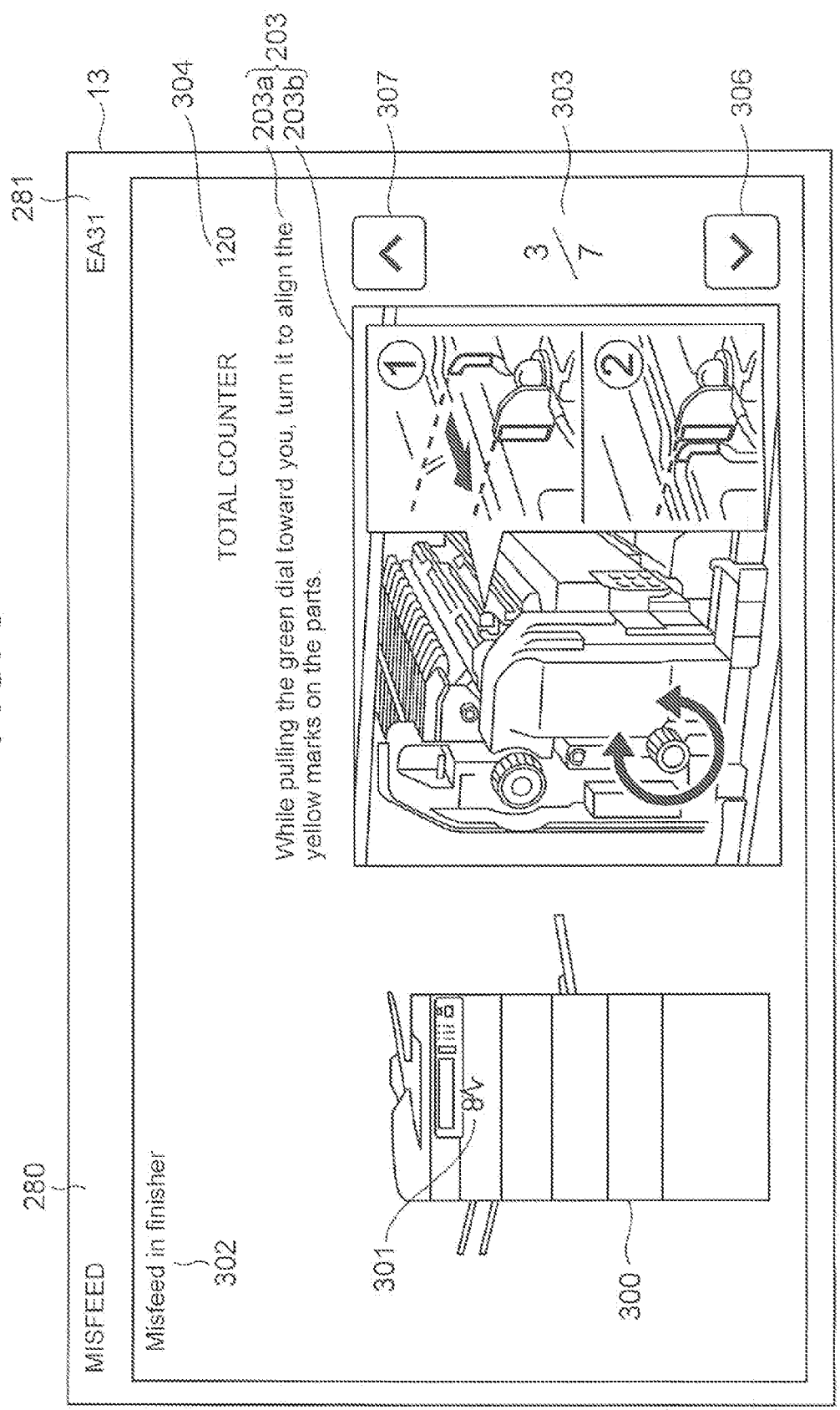

IMAGE FORMING APPARATUS FOR DISPLAYING GUIDANCE

CROSS-REFERENCE TO RELATED APPLICATION

This application is based upon and claims the benefit of priority from Provisional U.S. Applications 61/540,502 filed on Sep. 28, 2011 and 61/540,500 filed on Sep. 28, 2011 the entire contents of which are incorporated herein by reference.

FIELD

Embodiments described herein relate generally to an image forming apparatus including a display function for informing a user of various states of use, operation procedures, and the like.

BACKGROUND

As an image forming apparatus, there is an apparatus that displays various states of the apparatus on an operation panel and displays guidance for operation by a user on the operation panel. However, if it is difficult for the user to understand displayed guidance, the user is likely to operate the apparatus by mistake.

BRIEF DESCRIPTION OF THE DRAWINGS

FIG. 8 is a schematic explanatory diagram of an example of a screen of a display according to the embodiment.

DETAILED DESCRIPTION

In general, according to an embodiment, a display device includes: a detecting section configured to detect information concerning a sheet; a control section configured to set image guidance according to a result of the detection by the detecting section; and a display section configured to display the image guidance set by the control section.

Figure 1:
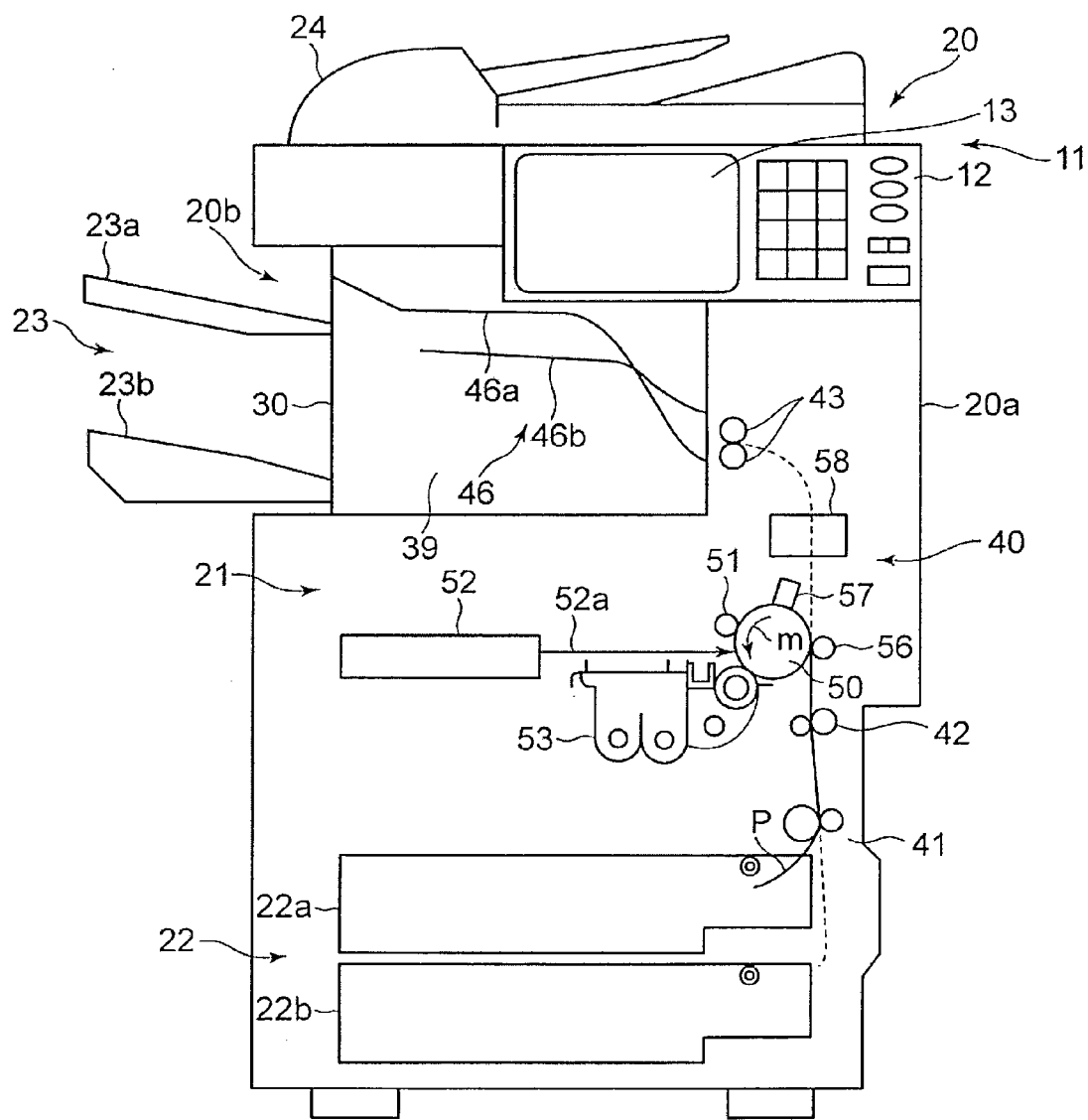
FIG. 1 is a schematic configuration diagram of an MFP according to an embodiment.

An embodiment is explained below. FIG. 1 is a schematic configuration diagram of an MFP (Multi Function Peripheral) 20, which is an example of an image forming apparatus according to this embodiment. The MFP 20 is mounted with an operation panel 11. The operation panel 11 is present, for example, in an upper part of a main body 20a of the MFP 20. The operation panel 11 pivots with respect to the main body 20a. The operation panel 11 includes, for example, a keyboard 12 that receives an input by a user and a display 13 of a touch panel type, which is a display section that receives an input by the user and performs display for the user.

The MFP 20 includes, as an image forming section, a printer section 21 that forms an image on a sheet P, a paper feeding section 22 that feeds the sheet P to the printer section 21, a paper discharge section 23 that stores the sheet P having thereon the image formed by the printer section 21, and a scanner 24. The MFP 20 includes a finisher 30 as the image forming section in a body 20b of the main body 20a. The paper discharge section 23 configures a part of the finisher 30. The finisher 30 subjects the sheet P to finishing between from the printer section 21 to the paper discharge section 23. The finisher 30 includes, in the body 20b of the main body 20a, a front cover 39 that can be opened and closed in a set state. The MFP 20 includes, as the image forming section, a conveying section 40 for the sheet P extending from the paper feeding section 22 to the paper discharge section 23 through the printer section 21 and the finisher 30.

The paper feeding section 22 includes paper feeding cassettes 22a and 22b. The paper feeding cassettes 22a and 22b can feed, for example, an unused sheet and a reuse sheet (a sheet from which an image is decolored by decoloring processing).

The printer section 21 includes, for example, around a photoconductive drum 50 that rotates in an arrow m direction, a charging device 51 and a laser exposing device 52 that irradiates a laser beam 52a based on image data or the like on the photoconductive drum 50 and forms an electrostatic latent image on the photoconductive drum 50. The printer section 21 includes, around the photoconductive drum 50, a developing device 53 that supplies a toner to the electrostatic latent image on the photoconductive drum 50, a transfer device 56 that transfers a toner image formed on the photoconductive drum 50 onto the sheet P, and a cleaner 57.

The developing device 53 supplies the toner to the electrostatic latent image on the photoconductive drum 50 using a two-component developer obtained by mixing the toner and a magnetic carrier. The toner may be either an undecolorable toner or a decolorable toner. The decolorable toner contains, for example, in binder resin and a coloring agent, a color assuming compound and a color developing agent. If a toner image formed by using the decolorable toner is heated at predetermined temperature, the color assuming compound and the color developing agent in the decolorable toner are dissociated to decolor the toner image. The printer section 21 includes a fixing device 58 between the photoconductive drum 50 and the finisher 30.

The conveying section 40 includes a paper feeding mechanism 41 that conveys the sheet P from the paper feeding section 22 in the direction of the photoconductive drum 50, a registration roller pair 42 that conveys the sheet P to between the photoconductive drum 50 and the transfer device 56 in synchronization with the toner image on the photoconductive drum 50, and a main body paper discharge roller 43 that conveys the sheet P to the finisher 30 after fixing. The conveying section 40 includes, in the finisher 30, a finisher path 46 for conveying the sheet P, which is fed from the main body paper discharge roller 43, to the paper discharge section 23.

The image forming apparatus is not limited to the above. The printer section of the image forming apparatus may be a color image forming apparatus including a plurality of developing devices. A print system of the printer section of the image forming apparatus is not limited to an electrophotographic system and may be an inkjet system or the like.

Figure 2:
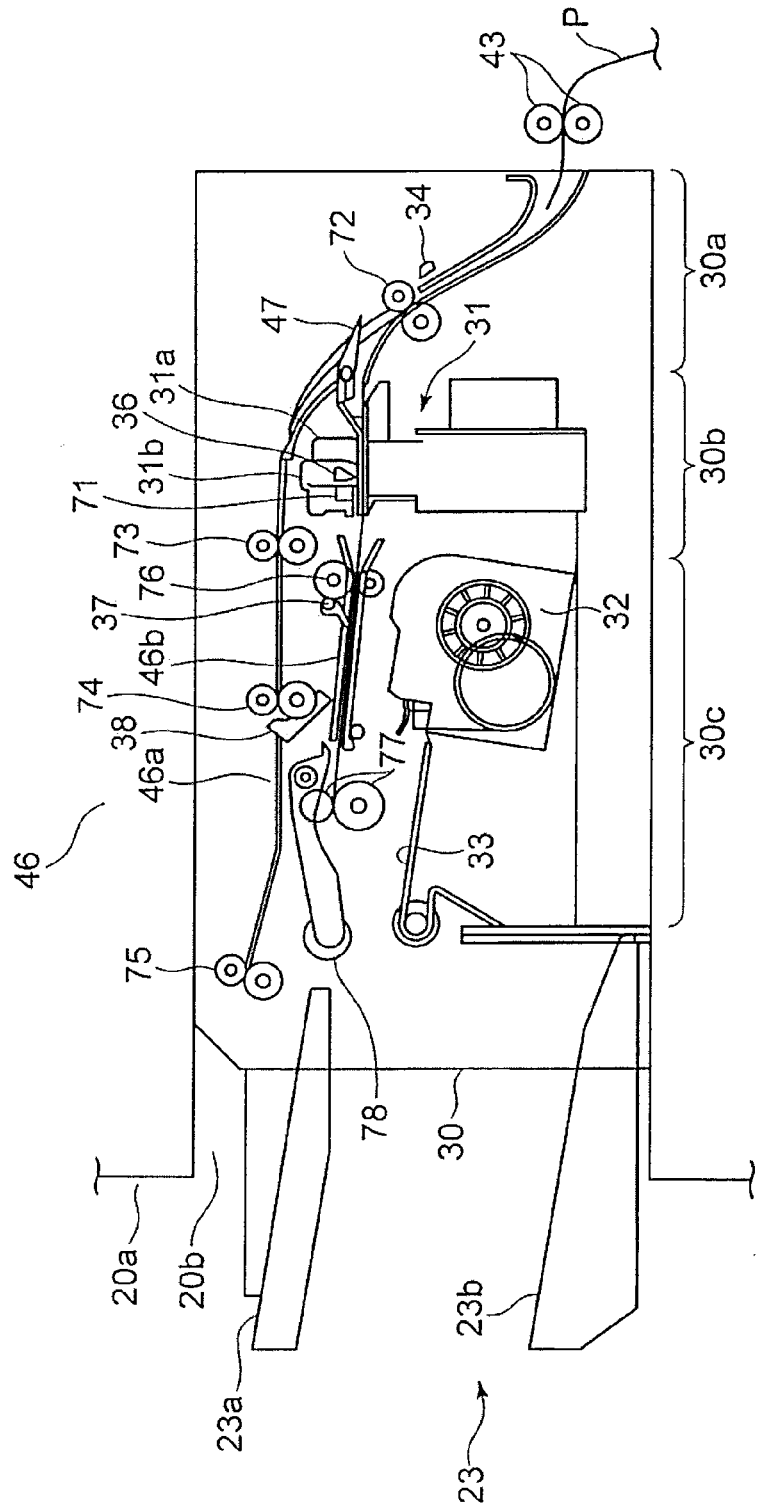
FIG. 2 is a schematic configuration diagram of a finisher according to the embodiment.

The finisher 30 is explained in detail. As shown in FIG. 2, the finisher 30 includes, for example, a finisher inlet section 30a, a finisher punching section 30b, and a finisher paper discharge section 30c. When the paper jam is removed, the finisher inlet section 30a, the finisher punching section 30b, and the finisher paper discharge section 30c of the finisher 30 are separated from one another to expose the finisher path 46.

The paper discharge section 23 configuring a part of the finisher 30 includes a fixed tray 23a and a movable tray 23b that slides up and down. The finisher path 46 of the finisher 30 includes an upper path 46a and a lower path 46b. The finisher inlet section 30a includes an inlet conveying roller 72 that conveys the sheet P, which is conveyed from the main body paper discharge roller 43, in the direction of the paper discharge section 23 and a gate 47 that diverts the sheet P, which is conveyed from the main body paper discharge roller 43, to the upper path 46a or the lower path 46b. The finisher punching section 30b includes a punching unit 31 along the lower path 46b. The punching unit 31 includes a die section 31a and a punch section 31b.

The finisher paper discharge section 30 includes a stapling unit 32 and a processing tray 33 along the lower path 46b. The finisher paper discharge section 30c includes a first upper path roller 73, a second upper path roller 74, and an upper path paper discharge roller 75 along the upper path 46a. The finisher paper discharge section 30c includes a lower path roller 76, a lower path paper discharge roller 77, and a sheet bundle discharge roller 78 along the lower path 46b.

If the sheet P discharged from the main body paper discharge roller 43 is discharged without being subjected to finishing, the gate 47 guides the sheet P to the upper path 46a. If the sheet P discharged from the main body paper discharge roller 43 is subjected to punching, stapling, or aligning, the gate 47 guides the sheet P to the lower path 46b.

The finisher 30 includes an inlet sensor 34, a punch path sensor 36 functioning as a first detecting section, a lower path sensor 37, and an upper path sensor 38, which detect a paper jam in the finisher path 46. The finisher 30 includes a punch HP sensor 71 functioning as a second detecting section and a punch detecting section. The punch path sensor 36 detects first information, i.e., a paper jam in the finisher punching section 30b. The punch HP sensor 71 detects second information, i.e., position information concerning whether the die section 31a is present in a home position.

Figure 3:
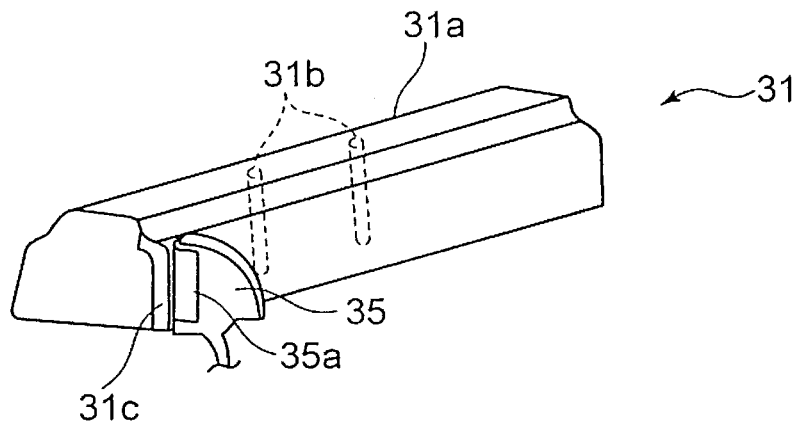
FIG. 3 is a schematic explanatory diagram of the position of a unit mark of a die section present in a home position, according to the embodiment.

If a punching action is not performed as shown in FIG. 3, the die section 31a is present in the home position. A front side of the die section 31a includes a yellow unit mark 31c. The finisher punching section 30b includes, in a bracket 35 on a front side, a yellow land mark 35a indicating a position serving as a reference for the home position of the die section 31a. If the die section 31a is present in the home position, the positions of the unit mark 31c and the land mark 35a are aligned.

Figure 4:
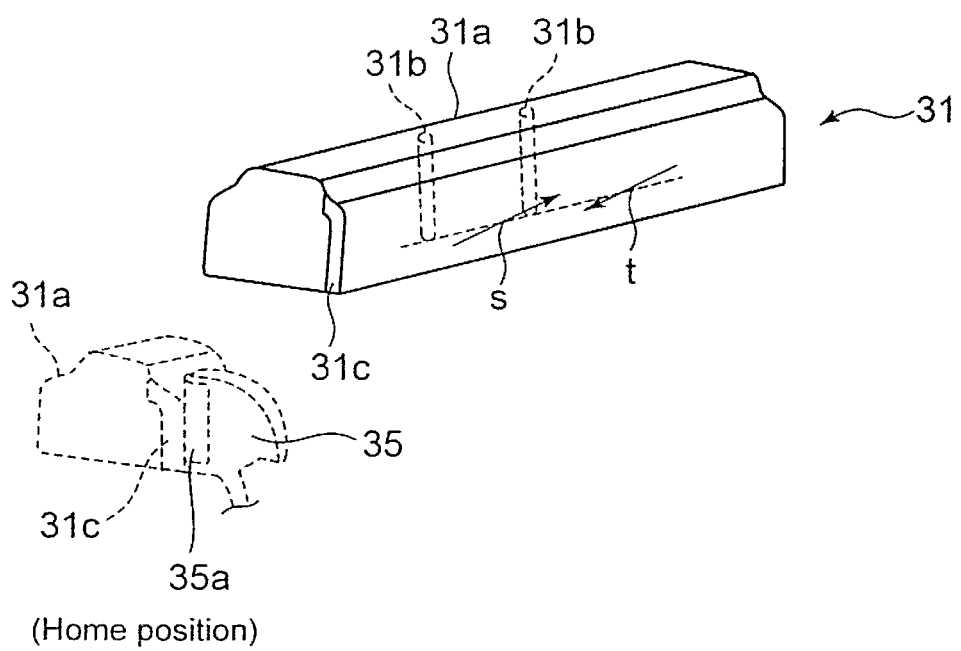
FIG. 4 is a schematic explanatory diagram of the position of the unit mark of the die section during a punching action, according to the embodiment.

As shown in FIG. 4, the die section 31a slides in an arrow s direction from the home position which is indicated by dotted line and holds the punch section 31b downward to open a hole in the sheet P. If the punching action is performing, the positions of the unit mark 31c and the land mark 35a are apart from each other. After the punching action ends, the punch section 31b is lifted and then the die section 31a is slid in an arrow t direction and returned to the home position.

Figure 5:
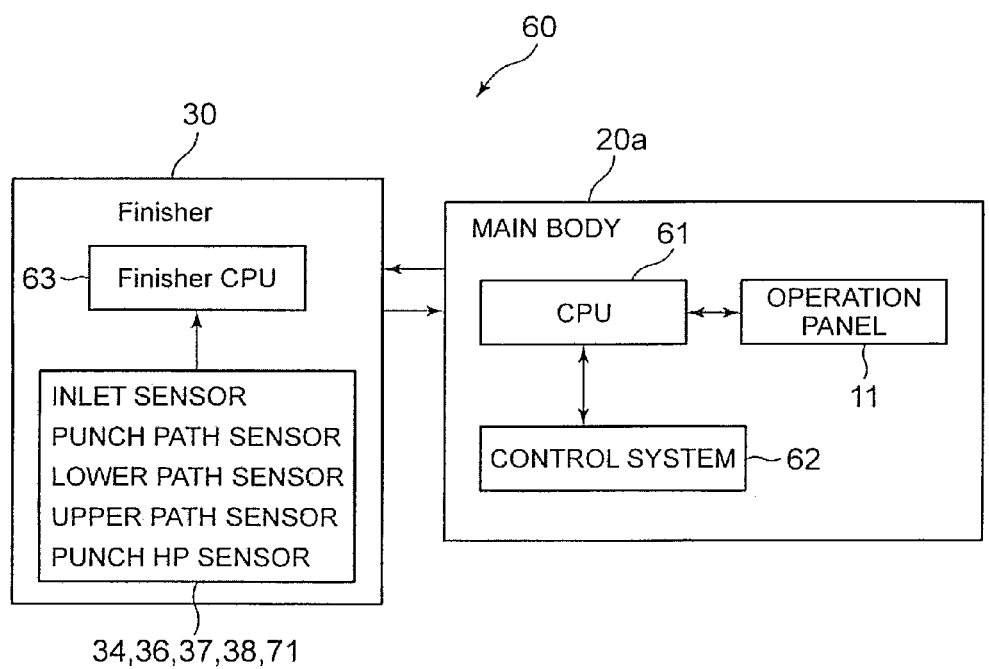
FIG. 5 is a schematic block diagram of a control system mainly used for removing a paper jam of the finisher according to the embodiment.

A control system 60 of the MFP 20 mainly used for removing a paper jam of the finisher 30 is shown in FIG. 5. The control system 60 includes, in the main body 20a of the MFP 20, a CPU 61 functioning as a control section. The CPU 61 controls the entire MFP 20 including the finisher 30. The CPU 61 is connected to the operation panel 11 and a control system 62. The finisher 30 includes a finisher CPU 63. The inlet sensor 34, the punch path sensor 36, the lower path sensor 37, the upper path sensor 38, and the punch HP sensor 71 are connected to the finisher CPU 63. The finisher CPU 63 is connected to the CPU 61.

The CPU 61 sets, according to detection results of the inlet sensor 34, the punch path sensor 36, the lower path sensor 37, the upper path sensor 38, and the punch HP sensor 71 input from the finisher CPU 63, a state of use of the finisher 30 to be communicated to the user or the like, an operation procedure serving as image guidance for the user or the like to operate the MFP 20 while looking at the image guidance, and the like. The CPU 61 controls display of the display 13 of the operation panel 11 using the control system 62 on the basis of the state of use of the finisher 30, the operation procedure, and the like set as explained above.

While the MFP 20 performs warm-up after power on or while the MFP 20 returns from a sleep mode (in the case of power-on and in a state in which power supply to a heat source of the printer section 21 is interrupted), the MFP 20 detects a paper jam of the conveying section 40. If a paper jam occurs in the conveying section 40, the CPU 61 specifies a place of occurrence of the paper jam and sets image guidance indicating a procedure for removing the paper jam. The CPU 61 controls the display 13 to display the place of occurrence of the paper jam and display the image guidance indicating the procedure for removing the paper jam.

For example, setting of image guidance displayed on the display 13 if a paper jam in the finisher 30 is detected is explained with reference to a flowchart of FIG. 6. The CPU 61 turns on a power supply for the MFP 20 or starts return from the sleep mode of the MFP 20 (ACT 100). The CPU 61 proceeds to ACT 101. If a sensor signal from the inlet sensor 34, the punch path sensor 36, the lower path sensor 37, or the upper path sensor 38 is absent (No in ACT 101), the CPU 61 determines that a paper jam does not occur in the finisher 30 and sets the MFP 20 to Ready or restarts the MFP 20 (ACT 110).

If the CPU 61 determines, according to a sensor signal from the inlet sensor 34, the punch path sensor 36, the lower path sensor 37, or the upper path sensor 38, that a paper jam occurs in the finisher 30 (Yes in Act 101), the CPU 61 proceeds to ACT 102.

In ACT 102, the CPU 61 determines whether the sensor signal is a signal from the punch path sensor 36. If the sensor signal is a signal that from the punch path sensor 36 (Yes in Act 102), the CPU 61 proceeds to ACT 103. If the sensor signal is a signal that from the sensor other than the punch path sensor 36 (No in ACT 102), the CPU 61 proceeds to ACT 108.

In ACT 108, the CPU 61 sets JAM guidance (3) and controls the display 13 to display the JAM guidance (3). The JAM guidance (3) is image guidance indicating a procedure of operation for removing a paper jam in a place other than the punching unit 31 of the finisher 30.

In ACT 103, the CPU 61 determines whether a signal from the punch HP sensor 71 is present. If the punch HP sensor 71 detects absence of the die section 31a in the home position (Yes in ACT 103), the CPU 61 proceeds to ACT 106. If a signal from the punch HP sensor 71 is absent and the punch HP sensor 71 detects presence of the die section 31a in the home position (No in ACT 103), the CPU 61 proceeds to ACT 107.

In ACT 106, the CPU 61 sets JAM guidance (1) and controls the display 13 to display the JAM guidance (1). The JAM guidance (1) is an image guidance including a procedure of operation for lifting the punch section 31b of the punching unit 31 and pulling the punch section 31b out of the sheet P before operation for removing a paper jam.

In ACT 107, the CPU 61 sets JAM guidance (2) and controls the display 13 to display the JAM guidance (2). The JAM guidance (2) is an image guidance obtained by excluding a procedure of the operation for pulling the punch section 31b of the punching unit 31 out of the sheet P, from the procedure of the JAM guidance (1).

If the user completes the paper jam removal operation according to the display in ACT 106, ACT 107, or ACT 108, the CPU 61 determines that a paper jam does not occur in the finisher 30 and sets the MFP 20 to Ready or restarts the MFP 20 (ACT 110).

The MFP 20 starts printing by being set to Ready or restarted. The MFP 20 supplies the sheet P from the paper feeding section 22 to the printer section 21 and forms a toner image on the sheet P in the printer section 21. The MFP 20 discharges the sheet P having the toner image formed thereon from the main body paper discharge roller 43 to the paper discharge section 23 through the finisher 30.

If the sheet P is discharged without being subjected to finishing, the gate 47 of the finisher 30 guides the sheet P to the upper path 46a and stores the sheet P in the fixed tray 23a. If the sheet P is subjected to punching, stapling, or aligning, the gate 47 guides the sheet P to the lower path 46b.

If the sheet P is subjected to the punching, the finisher 30 once stops the sheet P in a punching position of the finisher punching section 30b. The finisher 30 slides the die section 31a present in the home position in the arrow s direction to open a hole in the sheet P using the punch section 31b. After opening the hole in the sheet P, the finisher 30 slides the die section 31a in the arrow t direction and returns the die section 31a to the home position. The finisher 30 restarts the conveyance of the sheet P subjected to the punching and stores the sheet P in the movable tray 23b.

Figure 6:
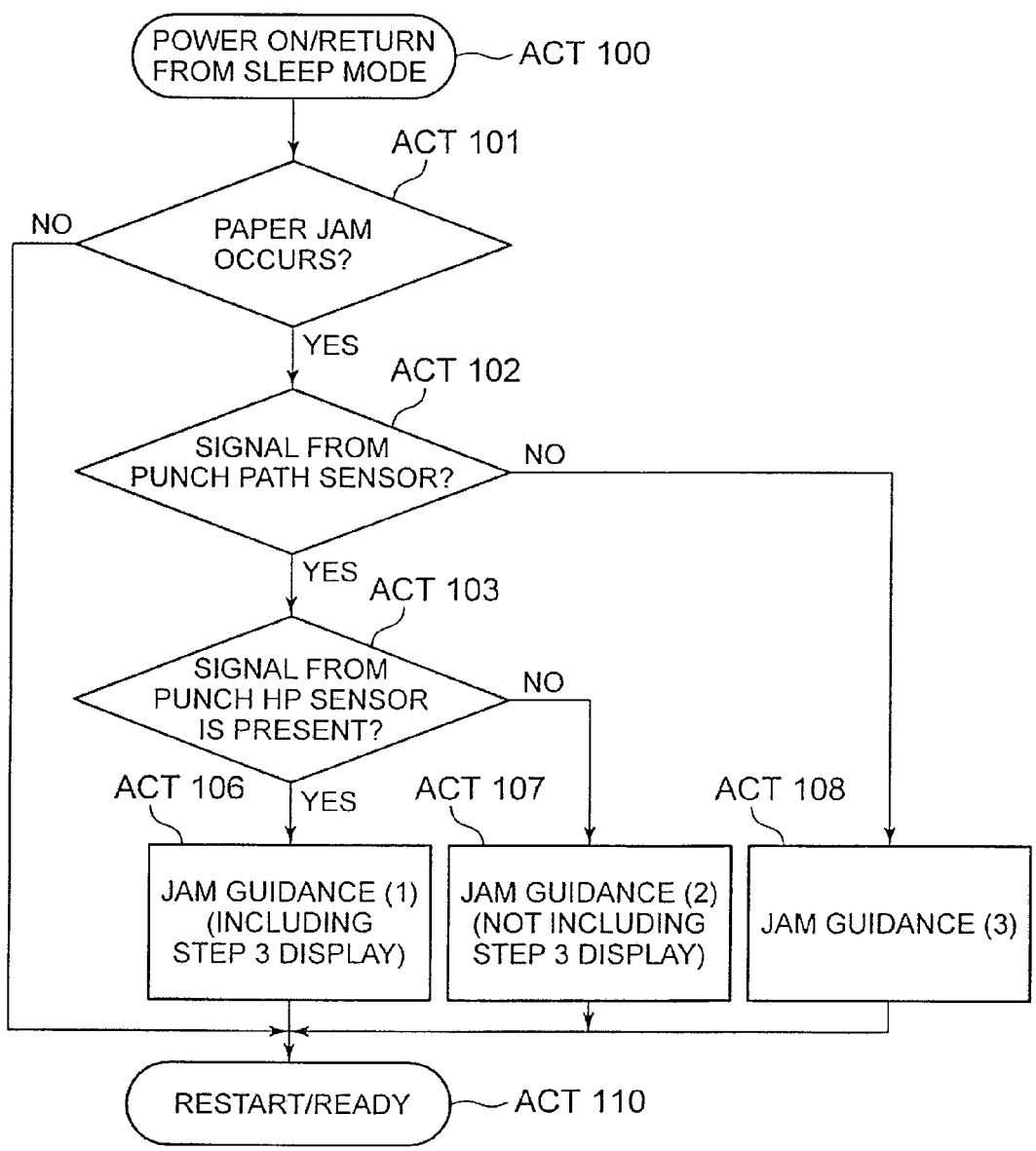
FIG. 6 is a flowchart for explaining display processing for image guidance for removing a paper jam of the finisher according to the embodiment.

If a paper jam occurs in the finisher 30 during printing, the CPU 61 causes, according to the flowchart of FIG. 6, the display 13 to display a place of the occurrence of the paper jam on the display 13 and display any one of the JAM guidance (1) to the JAM guidance (3), which indicates the procedure for removing the paper jam. During the printing, the CPU 61 determines, according to a sensor signal from the inlet sensor 34, the punch path sensor 36, the lower path sensor 37, or the upper path sensor 38, whether a paper jam occurs and carries out ACT 102 and subsequent acts in FIG. 6 in order to set JAM guidance. If the sheet P does not reach the finisher 30 even if a predetermined time elapses or if the sheet P stays in the finisher 30 even if the predetermined time elapses, the inlet sensor 34, the punch path sensor 36, the lower path sensor 37, or the upper path sensor 38 notifies a paper jam to the CPU 61 using a sensor signal.

Each of the JAM guidance (1) to the JAM guidance (3) includes steps, which are display screens, indicating a procedure of operation for removing a paper jam to the user.

(JAM Guidance (1))

Figure 7:
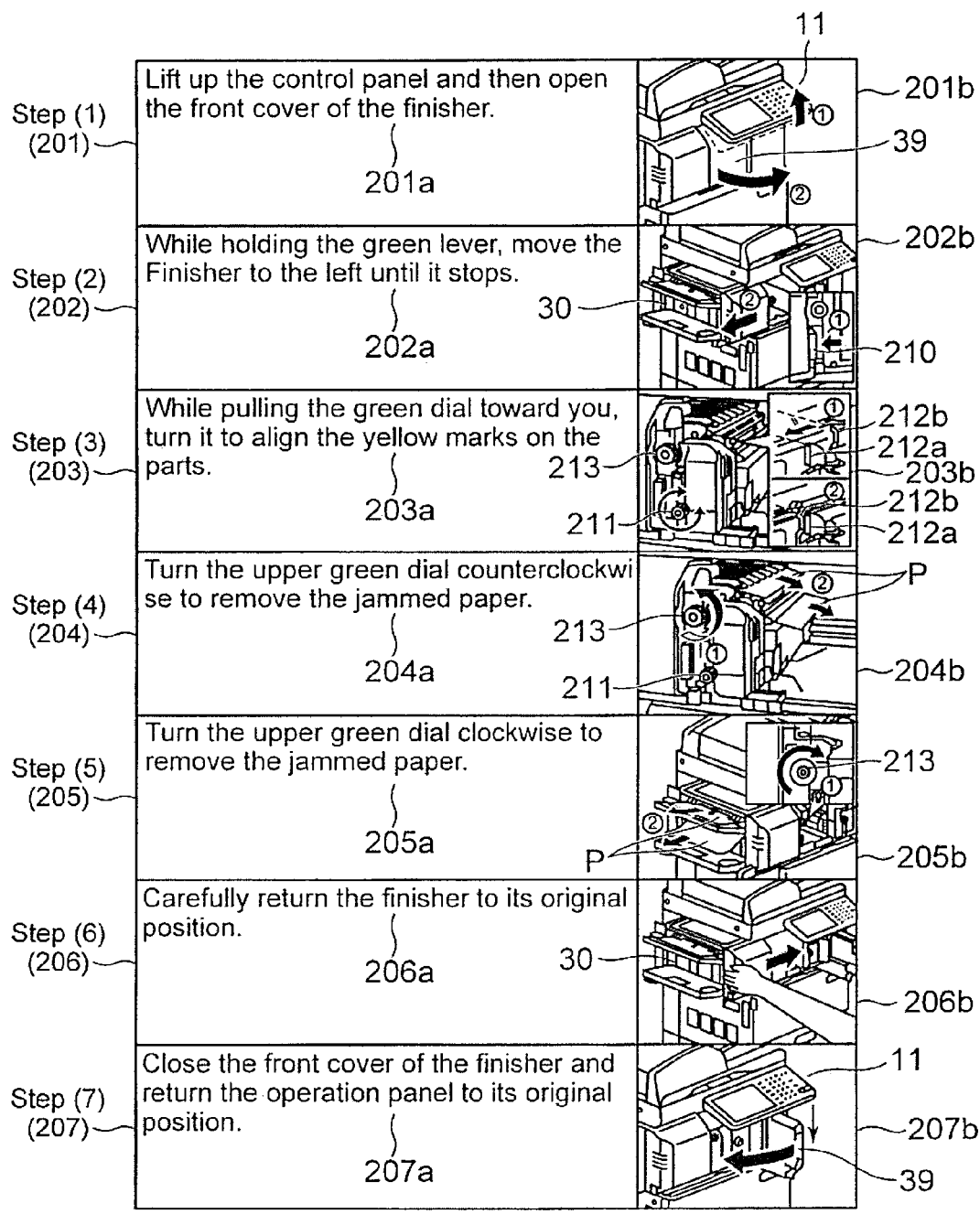
FIG. 7 is a schematic explanatory diagram of steps of JAM guidance (1) according to the embodiment.

For example, as shown in FIG. 7, the JAM guidance (1) includes a step 1 (201) to a step 7 (207) as the procedure of operation for removing a paper jam. The JAM guidance (1) includes, before removal of a paper jam, a first step, i.e., the step 3 (203) for returning the die section 31a to the home position. The step 3 (203) indicates a procedure of operation performed by the user in order to return the die section 31a to the home position to thereby lift the punch section 31b of the punching unit 31 and pull the punch section 31b out of the sheet P.

The step 1 (201) of the JAM guidance (1) includes a message (201a) "Lift up the operation panel and then open the front cover of the finisher." and an image data (201b) "indicating, with an arrow (1), a direction in which the operation panel 11 is lifted and indicating, with an arrow (2), a direction in which the front cover 39 of the finisher 30 is opened". The step 2 (202) includes a message (202a) "While holding the green lever, move the Finisher to the left until it stops." and an image data (202b) "indicating, with the arrow (1), a position or a direction in which a green lever 210 is held and indicating, with the arrow (2), a direction in which the finisher punching section 30b and the finisher paper discharge section 30c are integrally moved".

The step 3 (203) includes a message (203a) "While pulling the green dial toward you, turn it to align the yellow marks on the parts." and an image data (203b) "indicating, with an arrow, the rotation of a green dial 211 and showing a balloon (1) in which two yellow marks 212a and 212b are apart from each other and a balloon (2) in which the front and rear positions of the two yellow marks 212a and 212b are aligned". The image data (203b) displays the balloon (1) and the balloon (2) at a time.

The step 4 (204) includes a message (204a) "Turn the upper green dial counterclockwise to remove the jammed sheet." and an image data (204b) "indicating, with the arrow (1), a direction in which the upper green dial 213 is turned and indicating, with the arrow (2), a removing direction of the sheet P". The step 5 (205) includes a message (205a) "Turn the upper green dial clockwise to remove the jammed paper." and an image data (205b) "showing a balloon (1) in which an upper green dial 213 is turned clockwise and indicating, with the arrow (2), a removing direction of the sheet P".

The step 6 (206) includes a message (206a) "Carefully return the finisher to its original position." and an image data (206b) "showing an arrow for returning the finisher punching section 30b and the finisher paper discharge section 30c". The step 7 (207) includes a message (207a) "Close the front cover of the finisher and return the operation panel to its original position." and an image data (207b) "showing an arrow for closing the front cover 39 and an arrow for returning the operation panel 11".

The display 13 sequentially displays the JAM guidance (1) from the step 1. An example of a screen of the display 13 that displays the step 3 (203) of the JAM guidance (1) is shown in FIG. 8. If a sensor signal from any one of the inlet sensor 34, the punch path sensor 36, the lower path sensor 37, and the upper path sensor 38 is present, the display 13 displays "MISFEED" 280 and an error code "EA31". The display 13 lights a jam mark 301 in a finisher region of an MFP image 300 and displays a notification message 302 "Misfeed in finisher".

The display 13 displays the message 203a and the image data 203b in the step 3 (203) beside the MFP image 300. The display 13 displays a page "3/7" 303 for displaying that the step 3 (203) is the third step among the seven steps in total and a "total counter: 120" 304. The display 13 displays a forward instruction button 306 for scrolling the step 3 (203) to the next step and a return instruction button 307 for scrolling the step 3 (203) to the previous step.

(Operation by the User Conforming to the JAM Guidance (1))

If a paper jam occurs in a state in which the punch section 31b of the punching unit 31 is opening a hole in the sheet P, the display 13 displays, beside the MFP image 300 in which the jam mark 301 is lit in the finisher region, the message 201a and the image data 201b indicating the first procedure for paper jam removal of the step 1 (201). The user lifts the operation panel 11 of the MFP 20 and opens the front cover 39 while looking at the image data 201b on the display 13.

According to the steps for paper jam removal displayed by the display 13, every time the user completes the operation, the user touches the forward instruction button 306 and sequentially displays the next step on the display 13. In the step 2 (202), the user moves the finisher punching section 30*b* and the finisher paper discharge section 30*c* integrally to the left until the sections stop and then touches the forward instruction button 306.

In the step 3 (203), the display 13 displays the image data (203*b*) for displaying the balloon (1) and the balloon (2) at a time. Therefore, first, the user looks at the balloon (1) and confirms that the positions of the unit mark 31*c* and the land mark 35*a* of the die section 31*a* are apart from each other. The user turns the green dial while pulling the same. The die section 31*a* slides in the arrow t direction. The user turns the green dial while pulling the same until the unit mark 31*c* and the land mark 35*a* are aligned as displayed in the balloon (2). If the unit mark 31*c* and the land mark 35*a* are aligned, the user touches the forward instruction button 306.

The user can perform, only by turning the green dial while looking at the image data (203*b*), operation for pulling the punch section 31*b* of the punching unit 31 out of the sheet P before performing paper jam removal. Even a user unaccustomed to the operation can easily understand that an adjustment amount of the green dial is an amount for turning the green dial until the marks are aligned by looking at the balloon (2). The image data (203*b*) displays, at a time, the balloon (1) of the state in which the marks are apart and the balloon (2) of the state in which the marks are aligned. Therefore, during the operation for pulling the punch section 31*b* of the punching unit 31 out of the sheet P, the user can check a state before the operation without operating, for example, the return instruction button 307. During the operation for pulling the punch section 31*b* of the punching unit 31 out of the sheet P, the scroll operation of the display screen of the display 13 by the user is unnecessary.

In the step 4 (204), the removes the sheet P present in the finisher punching section 30*b* in the direction of the main body paper discharge roller 43 and touches the forward instruction button 306. In the step 5 (205), the user removes the sheet P present in the finisher punching section 30*b* in the direction of the paper discharge section 23 and touches the forward instruction button 306.

After removing the paper jam in the finisher punching section 30*b*, in the step 6 (206), the user returns the finisher punching section 30*b* and the finisher paper discharge section 30*c* to the original positions thereof. In the step 7 (207), the user closes the front cover 39 of the finisher 30 and returns the operation panel 11 to the original position thereof.

The user sequentially advances the screen of the display 13, completes the operation of the removal procedure displayed in the step 1 (201) to the step 7 (207) of the JAM guidance (1), and completes the removal operation for the paper jam. According to the removal procedure displayed in the step 7 (207), the user closes the front cover 39 of the finisher 30 and returns the operation panel 11 to the original position. Then, the CPU 61 proceeds to the ACT 110 of the flowchart of the FIG. 6, and sets the MFP 20 to the Ready or restarts the MFP 20.

The paper jam that occurs in the state in which the punch section 31*b* of the punching unit 31 is opening a hole in the sheet P is not limited to the paper jam in the finisher punching section 30*b* that occurs during the punching action. Even if the finisher 30 is not performing the punching action, if a paper jam occurs in the finisher punching section 30*b* and if the CPU 61 detects absence of the die section 31*a* in the home position, the CPU 61 sets the JAM guidance (1) as image guidance displayed on the display 13.

(JAM Guidance (2))

The JAM guidance (2) is displayed on the display 13 if a paper jam occurs in the finisher punching section 30*b* and if the punch HP sensor 71 detects presence of the die section 31*a* in the home position. The JAM guidance (2) does not need to indicate to the user the operation for pulling the punch section 31*b* of the punching unit 31 out of the sheet P. If the die section 31*a* is present in the home position and if the JAM guidance (2) indicates to the user the operation for pulling the punch section 31*b* of the punching unit 31 out of the sheet P, a user unaccustomed to the operation may be unable to decide operation.

The JAM guidance (2) shows only a necessary procedure excluding the step for showing an unnecessary procedure from the JAM guidance (1). In the JAM guidance (2), the display of the step 3 (203) indicating the operation for pulling the punch section 31*b* of the punching unit 31 out of the sheet P is excluded from the JAM guidance (1).

In the JAM guidance (2), the display 13 sequentially displays the steps 1, 2, and 4 to 7. The user carries out the steps 1 and 2 according to the JAM guidance (2). In the step 1 (201), the user lifts the operation panel 11 and opens the front cover 39. In the step 2 (202), the user moves the finisher punching section 30*b* and the finisher paper discharge section 30*c* to the left until the sections stop. Subsequently, the user carries out the step 4 displayed on the display 13. After the step 2 (202), in the step 4 (204) and the step 5 (205), the user immediately removes the sheet P present in the finisher punching section 30*b*.

If the paper jam is removed, in the step 6 (206), the user returns the finisher punching section 30*b* and the finisher paper discharge section 30*c* to the original positions. In the step 7 (207), the user closes the front cover 39 of the finisher 30, returns the operation panel 11 to the original position, and completes the paper jam removal operation. If the paper jam removal operation is completed, the CPU 61 proceeds to ACT 110 of the flowchart of FIG. 6 and sets the MFP 20 to Ready or restarts the MFP 20.

Since the step 3 (203), which is an unnecessary procedure, is excluded in the guidance (2), even a user unaccustomed to the operation can operate only a procedure necessary for the paper jam removal without hesitation.

Even if the punching unit 31 is not originally used, if a paper jam occurs in the finisher punching section 30*b*, the JAM guidance (2) is displayed on the display 13. However, while the paper jam in the finisher punching section 30*b* is removed, for example, a user unaccustomed to sheet removal operation sometimes turns by mistake the green dial 211 for moving the die section 31*a*. If the user turns the green dial 211 by mistake, it is likely that the punch section 31*b* of the punching unit 31 sticks into the sheet P. In this case, if the JAM guidance (2) is kept displayed on the display 13, the user may not be able to understand operation for pulling the punch section 31*b* of the punching unit 31 out of the sheet P.

If the punch HP sensor 71 detects absence of the die section 31*a* in the home position regardless of the display of the JAM guidance (2), the CPU 61 switches the display of the JAM guidance (2) of the display 13 and displays the JAM guidance (1) again. For example, even after the user removes the paper jam according to the JAM guidance (2), if the punch path sensor 36 detects a paper jam and the punch HP sensor 71 detects absence of the die section 31*a* in the home position, the CPU 61 switches the display of the display 13 to the JAM guidance (1).

The re-display of the JAM guidance is not limited to the removal of the paper jam in the finisher punching section 30*b*. For example, if the user moves the die section 31*a* by mistake while removing a paper jam of the finisher paper discharge section 30*c* according to the JAM guidance (3) explained below, the CPU 61 may display the JAM guidance (1) again.

For example, even after the user removes the paper jam of the finisher paper discharge section 30c according to the JAM guidance (3), if the punch HP sensor 71 detects absence of the die section 31a in the home position, the CPU 61 switches the display of the display 13 to the JAM guidance (1).

The re-display of the JAM guidance is not limited to the removal of the paper jam in the finisher punching section 30b. The re-display of the JAM guidance may be performed in removal of a paper jam in the conveying section 40 of the main body 20a of the MFP 20.

(JAM Guidance (3))

In the JAM guidance (3), as in the JAM guidance (1) or the JAM guidance (2), a procedure of operation for removing a paper jam in the finisher inlet section 30a or the finisher paper discharge section 30c other than the punching unit 31 of the finisher 30 is displayed on the display 13.

If a paper jam occurs in the finisher inlet section 30a or the finisher paper discharge section 30c, the user performs removal operation and removes the paper jam according to the JAM guidance 3.

A guide section or content of guide by the JAM guidance is not limited. The JAM guidance may be, for example, JAM guidance for paper jam removal in the conveying section 40 in the main body 20a of the MFP 20. Even in the conveying section 40 in the main body 20a of the MFP 20, during the JAM guidance, only the steps necessary for operation by the user are displayed on the display 13. The steps unnecessary for the operation by the user are displayed on the display 13 while being excluded from the JAM guidance.

According to this embodiment, if the die section 31a is absent in the home position, the JAM guidance (1) including the step 3 (203), which is the operation for returning the die section 31a to the home position, is sequentially displayed on the display 13. If the die section 31a is present in the home position, the JAM guidance (2) in which the step 3 (203) is excluded from the JAM guidance (1) is sequentially displayed on the display 13.

If a paper jam occurs in the finisher punching section 30b, the operation panel 11 displays only the steps necessary for paper jam removal on the display 13 according to a state of the punching unit 31. The user can perform operation for the paper jam removal while checking only the necessary steps sequentially displayed on the display 13. Since the steps unnecessary for the operation are not displayed on the display 13, even a user unaccustomed to the operation can easily understand a procedure of the removal operation and operate only a procedure necessary for the paper jam removal without hesitation.

According to this embodiment, in the step 3 (203), the balloon (1) and the balloon (2) are displayed at a time. Therefore, the user does not need to perform the scroll operation for the display screen of the display 13 during the operation for pulling the punch section 31b of the punching unit 31 out of the sheet P.

While certain embodiments have been described these embodiments have been presented by way of example only, and are not intended to limit the scope of the inventions. Indeed, the novel apparatus and methods described herein may be embodied in a variety of other forms: furthermore various omissions, substitutions and changes in the form of the apparatus and methods described herein may be made without departing from the spirit of the inventions. The accompanying claims and there equivalents are intended to cover such forms of modifications as would fall within the scope and spirit of the invention.

What is claimed is:

1. A device comprising:
a conveyance detecting section positioned on a conveying path configured to convey a sheet to a paper discharge section of a main body, the conveyance detecting section being configured to detect information concerning the sheet;
a mechanism positioned in the main body and configured to move between a conveying path position and a home position;
a position detecting section positioned on the conveying path, the position detecting section being configured to detect a position information of the mechanism;
a display section positioned on the main body, the display section being configured to display an image guidance; and
a cover moveable between a closed position in which the mechanism is covered and an open position in which the cover is opened towards a front side of the display section;
a processor configured to
determine an operation for removing a jam based on the information detected by the conveyance detecting section and the position information detected by the position detecting section,
select an image guidance from a plurality of image guidances based on the determined operation for removing the jam, the selected image guidance including operation instructions associated with the determined operation for removing the jam and not including operation instructions that are not associated with the determined operation for removing the jam, and
control the display section to display the selected image guidance when the jam occurs and to include in the displayed image guidance, based on the information detected by the conveyance detecting section and the position information detected by the position detecting section, a figure with multiple balloon images displayed on the display section at one time, each balloon image corresponding to a portion of the figure that indicates a single step of the operation for removing the jam, the image guidance also including a first operation procedure showing a dial being rotated in a first direction to manually convey the sheet and a second operation procedure showing the dial being rotated in a second direction opposite the first direction to move the mechanism to the home position.

2. The device according to claim 1, wherein the processor controls the display of the image guidance on the display section so that:
when the jam is detected by the conveyance detecting section and when the position information of the mechanism detected by the position detecting section indicates that the mechanism is not in the home position, the image guidance displayed on the display section includes the second operation procedure having a first step indicating to return the mechanism to the home position, and
when the jam is detected by the conveyance detecting section and when the position information of the mechanism detected by the position detecting section indicates that the mechanism is in the home position, the image guidance displayed on the display includes a second guidance having plural steps and excluding the first step.

3. The device according to claim 1, wherein the mechanism is a punching unit configured to punch the sheet and the position detecting section is configured to detect a position information of the punching unit.

4. An image forming apparatus comprising:
- an image forming section positioned in a main body and configured to form an image on a sheet;
- a scanning section positioned on a top of the main body and configured to scan an original document;
- a mechanism positioned between the scanning section and the image forming section and configured to move between a conveying path position and a home position;
- a conveyance detecting section positioned on a conveying path configured to convey a sheet to a paper discharge section of the main body, the conveyance detecting section being configured to detect information concerning the sheet;
- a position detecting section positioned on the conveying path, the position detecting section being configured to detect a position information of the mechanism;
- a display section positioned on the main body, the display section being configured to display an image guidance;
- a cover moveable between a closed position in which the mechanism is covered and an open position in which the cover is opened towards a front side of the display section; and
- a processor configured to
  - determine an operation for removing a jam based on the information detected by the conveyance detecting section and the position information detected by the position detecting section,
  - select an image guidance from a plurality of image guidances based on the determined operation for removing the jam, the selected image guidance including operation instructions associated with the determined operation for removing the jam and not including operation instructions that are not associated with the determined operation for removing the jam, and
  - control the display section to display the selected image guidance when a jam occurs and to include in the displayed image guidance, based on the information detected by the conveyance detecting section and the position information detected by the position detecting section, a figure with multiple balloon images displayed on the display section at one time, each balloon image corresponding to a portion of the figure that indicates a single step of the operation for removing the jam, the image guidance also including a first operation procedure showing a dial being rotated in a first direction to manually convey the sheet and a second operation procedure showing the dial being rotated in a second direction opposite the first direction to move the mechanism to the home position.

5. The apparatus according to claim 4, wherein the processor controls the display of the image guidance on the display section so that:
  when the jam is detected by the conveyance detecting section and when the position information of the mechanism detected by the position detecting section indicates that the mechanism is not in the home position, the image guidance displayed on the display section includes the second operation procedure having a first step indicating to return the mechanism to the home position, and
  when the jam is detected by the conveyance detecting section and when the position information of the mechanism detected by the position detecting section indicates that the mechanism is in the home position, the image guidance displayed on the display includes a second guidance having plural steps and excluding the first step.

6. The apparatus according to claim 4, wherein the mechanism is a punching unit configured to punch the sheet and the position detecting section is configured to detect a position information of the punching unit.

7. A device comprising:
- a conveyance detecting section positioned on a conveying path configured to convey a sheet to a paper discharge section of a main body, the conveyance detecting section being configured to detect information concerning the sheet;
- a mechanism positioned in the main body and configured to move between the conveying path position and a home position;
- a position detecting section positioned on the conveying path, the position detecting section being configured to detect a position information of the mechanism;
- a display section positioned on the main body, the display section being configured to display an image guidance;
- a cover moveable between a closed position in which the mechanism is covered and an open position in which the cover is opened towards a front side of the display section; and
- a processor configured to
  - determine an operation for removing a jam based on the information detected by the conveyance detecting section and the position information detected by the position detecting section,
  - select an image guidance from a plurality of image guidances based on the determined operation for removing the jam, the selected image guidance including operation instructions associated with the determined operation for removing the jam and not including operation instructions that are not associated with the determined operation for removing the jam, and
  - control the display section to display the selected image guidance including a first operation procedure showing a dial being rotated in a first direction to manually convey the sheet and a second operation procedure showing the dial being rotated in a second direction opposite the first direction to move the mechanism to the home position when the jam occurs.

* * * * *